United States Patent
Thomas et al.

(10) Patent No.: US 8,122,090 B2
(45) Date of Patent: Feb. 21, 2012

(54) METHOD FOR REQUESTING THE TERMINATION OF A COMMUNICATION SESSION

(75) Inventors: Peter E. Thomas, Schaumburg, IL (US); Ramandeep Ahuja, Chicago, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 745 days.

(21) Appl. No.: 11/926,254

(22) Filed: Oct. 29, 2007

(65) Prior Publication Data

US 2009/0113000 A1    Apr. 30, 2009

(51) Int. Cl.
*G06F 15/16* (2006.01)
*H04L 12/18* (2006.01)

(52) U.S. Cl. .................... 709/206; 370/261; 709/227
(58) Field of Classification Search .......... 709/206, 709/227; 370/260, 261; 348/14.08
See application file for complete search history.

(56) References Cited

U.S. PATENT DOCUMENTS

| | | | | |
|---|---|---|---|---|
| 6,286,034 | B1* | 9/2001 | Sato et al. | 709/204 |
| 7,536,463 | B2* | 5/2009 | Seo | 709/227 |
| 2003/0012149 | A1* | 1/2003 | Maggenti et al. | 370/260 |
| 2005/0015502 | A1 | 1/2005 | Kang | |
| 2006/0034195 | A1* | 2/2006 | Blaiotta et al. | 370/261 |
| 2006/0092863 | A1* | 5/2006 | Schmidt et al. | 370/260 |
| 2008/0129816 | A1* | 6/2008 | Mattila et al. | 348/14.08 |
| 2008/0192733 | A1* | 8/2008 | Song et al. | 370/352 |
| 2008/0208982 | A1* | 8/2008 | Morris | 709/206 |
| 2009/0150562 | A1* | 6/2009 | Kim et al. | 709/238 |
| 2010/0226287 | A1* | 9/2010 | Horvath et al. | 370/260 |

FOREIGN PATENT DOCUMENTS

| | | |
|---|---|---|
| JP | 2006203397 A | 8/2006 |
| JP | 2006229600 A | 8/2006 |
| KR | 1020040073223 A | 8/2004 |
| KR | 1020050043597 A | 5/2005 |

OTHER PUBLICATIONS

International Search Report Dated Apr. 17, 2009.

* cited by examiner

*Primary Examiner* — Jungwon Chang
(74) *Attorney, Agent, or Firm* — Lalita W. Pace; Anthony P. Curtis; Daniel R. Bestor

(57) ABSTRACT

A method for terminating a communication session is present. During a communication session in which communication devices are in communication through a server, one of the devices decides to terminate the session. This device generates a first message requesting permission to terminate participation in the session and sends it to the server. The server, receiving the first message, determines whether or not there is session media being communicated or pending communication to the device. If not, the server generates a second message authorizing the device to terminate its participation in the session and sends it to the device. The device continues to listen for session media until, upon receiving the second message, it terminates its participation in the session.

20 Claims, 4 Drawing Sheets

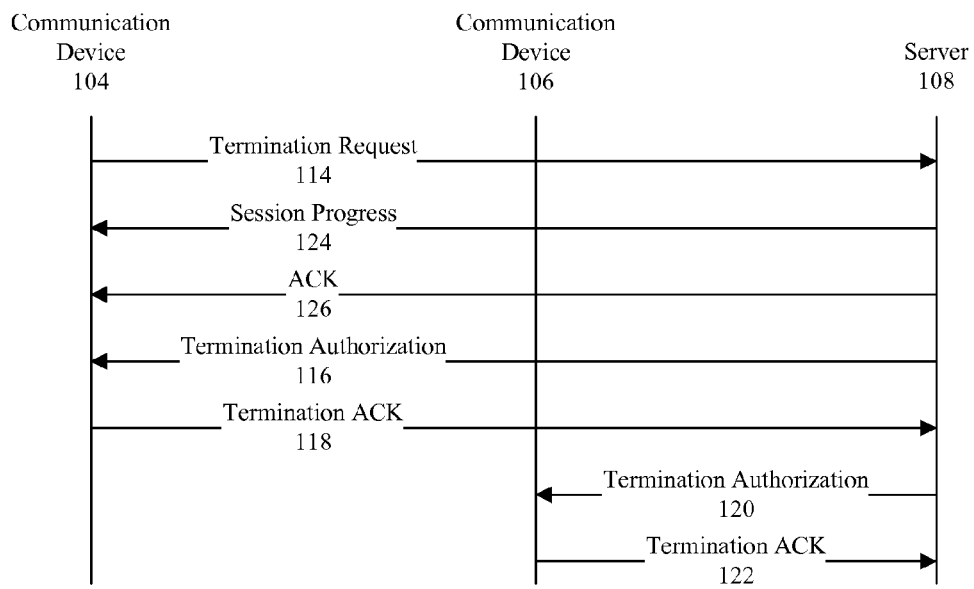

302 {
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>;
tag=193423474
From: Alice
<sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 58

304 {
v=0
o=bob 2890844730 2890844731 IN IP4
host.example.com
s=

402 {
UPDATE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>;
tag=193423474
From: Alice
<sip:alice@atlanta.com>;tag=1928301774
Call-ID: a84b4c76e66710
CSeq: 314159 UPDATE
Contact: <sip:alice@pc33.atlanta.com>
Content-Type: application/sdp
Content-Length: 58

404 {
v=0
o=bob 2890844730 2890844731 IN IP4
host.example.com
s=

FIG. 4

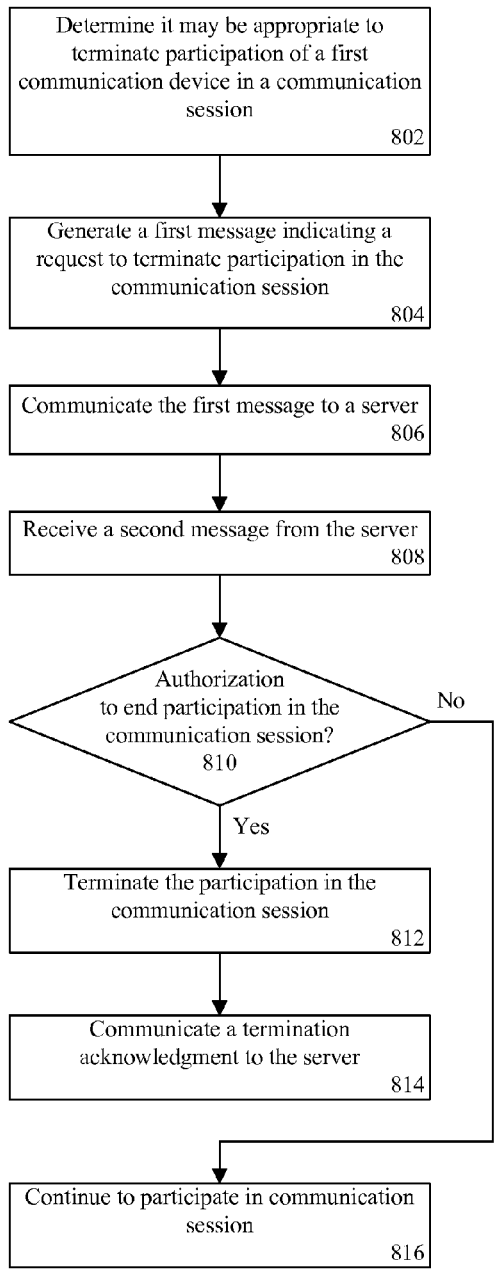
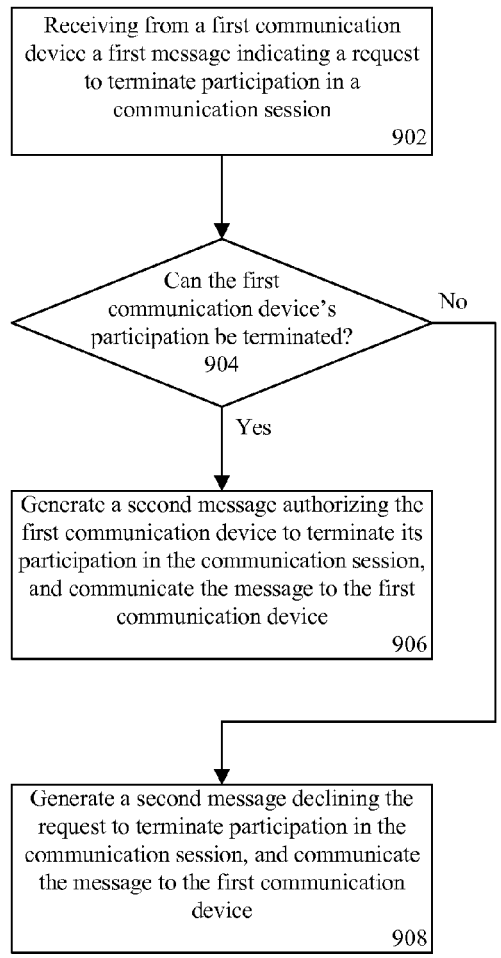
FIG. 8
FIG. 9

METHOD FOR REQUESTING THE TERMINATION OF A COMMUNICATION SESSION

BACKGROUND OF THE INVENTION

1. Field of the Invention

The present invention generally relates to communication systems and, more particularly, to packet based communication systems.

2. Background of the Invention

The Internet Protocol (IP) is a network layer protocol used for communicating data across a packet-switched communications network. In order to communicate using IP, session media (i.e. information) must be communicated using an IP compatible signaling protocol. Session Initiation Protocol (SIP) is one such protocol. SIP is an ASCII-based, application-layer control protocol that can be used to establish, maintain, and terminate calls between two or more communication devices (e.g. subscriber stations). With the proliferation of IP, SIP and corresponding infrastructure, IP and SIP are attractive networking resources to link various portions of a communication system.

In SIP, a communication device may request termination of a communication session, for example a call session, by sending a BYE request. When a BYE request is sent, SIP requires the communication device to immediately stop listening for session media. In certain types of communication systems, however, it is undesirable to allow a communication device to terminate an active communication session in this manner.

SUMMARY OF THE INVENTION

The present invention relates to a method for terminating a communication session. The method can include generating a first message requesting permission to terminate participation in the communication session and communicating the first message to a server. The method can also include receiving a second message from the server authorizing the participation in the communication session to be terminated and terminating the participation in the communication session.

The present invention also relates to a method for terminating a first communication device's participation in a communication session, which can include receiving from the first communication device a first message requesting permission to terminate participation in the communication session. Responsive to receiving the first message, at least a second message can be generated. The second message can authorize the first communication device to terminate its participation in the communication session. The second message can be communicated to the first communication device.

The present invention also relates to a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which:

FIG. 2 depicts a signaling flow diagram that is useful for understanding the present invention;

FIGS. 3-7 depict examples of termination requests that are useful for understanding the present invention;

FIG. 8 is a flowchart presenting a method of terminating a communication device's participation in a communication session, which is useful for understanding the present invention; and FIG. 9 is another flowchart presenting a method of terminating a communication device's participation in a communication session, which is useful for understanding the present invention.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
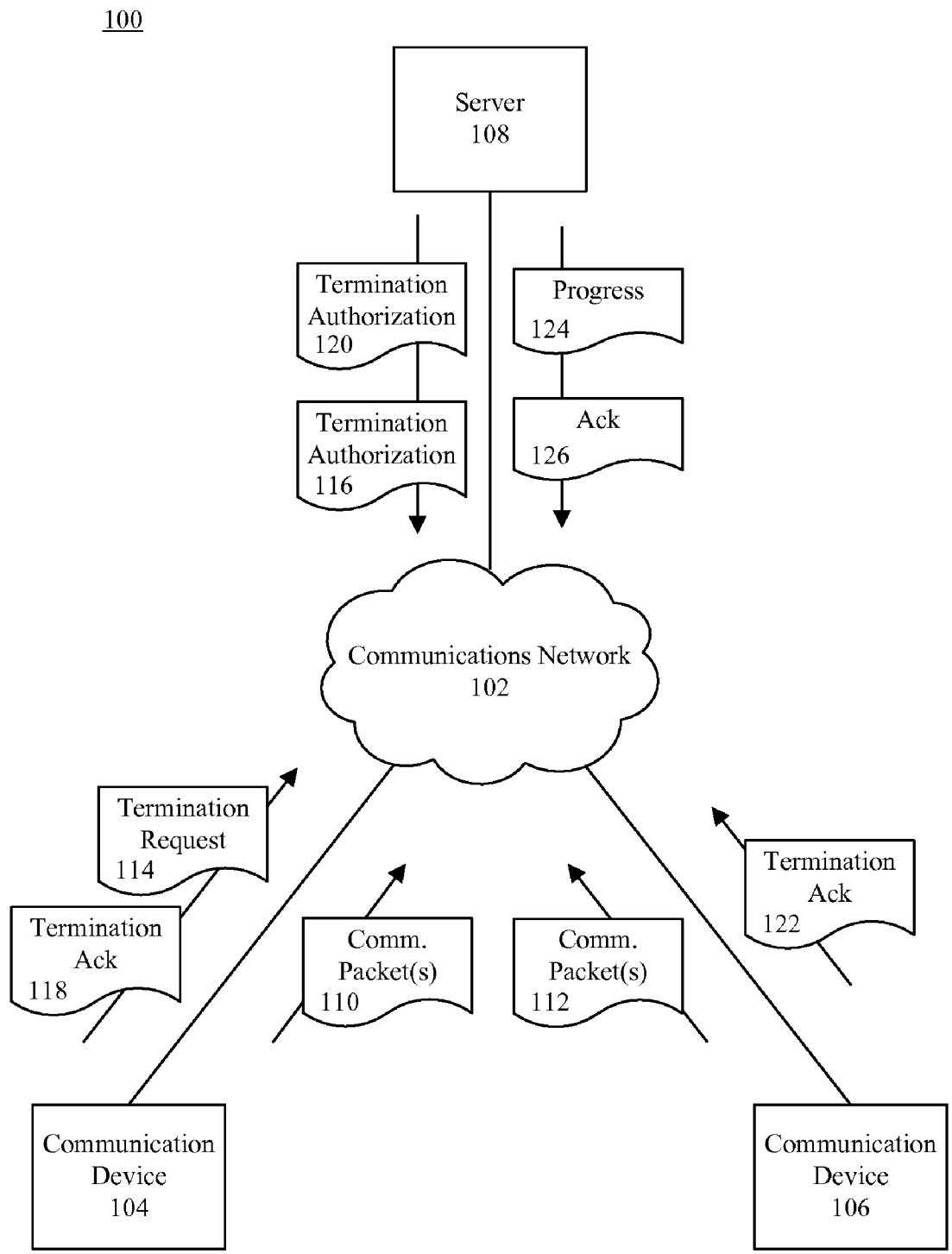
FIG. 1 depicts a block diagram of a communication system that is useful for understanding the present invention.

The present invention relates to a method for terminating a communication session. In particular, a communication device can communicate a message to a server requesting authorization to terminate the communication session. The communication device can continue listening for session media until such authorization is granted. FIG. 1 depicts a communication system 100 that is useful for understanding the present invention.

The communication system 100 can include a communications network 102, which may comprise any suitable network infrastructure, for example a wide area network (WAN), such as the Internet, the World Wide Web, a cellular communications network, a public switched telephone network (PSTN), and the like. Other examples of suitable network infrastructure may include, but are not limited to, a radio access network (RAN), a local area network (LAN), a metropolitan area network (MAN), a WiFi network, a Mesh network, a public safety network (e.g. Astro, TETRA, HPD, etc.) and/or any other networks or systems over which communication signals can be propagated. In that regard, the communications network 102 can include wired and/or wireless communication links.

The communications network 102 can be configured to communicate data via IEEE 802 wireless communications, for example, 802.11 and 802.16 (WiMAX), 3G, 4G, WPA, WPA2, GSM, TDMA, CDMA, WCDMA, OFDM, direct wireless communication, or any other communications format. Indeed, the communications network 102 can be implemented in accordance with any suitable communications standards, protocols, and/or architectures, or a suitable combination of such standards, protocols, and/or architectures.

The communication system 100 can also include one or more communication devices 104, 106 which communicate via the communications network 102. The communication devices 104, 106 can be, for instance, mobile stations (e.g. mobile telephones, mobile radios, mobile computers, personal digital assistants, or the like), computers, set top boxes, access terminals, subscriber stations, user equipment, or any other devices suitably configured to communicate via the communications network 102. As such, the communication devices 104, 106 can comprise one or more processors/controllers, data storage devices, user interfaces, communication adapters (e.g. transceivers, network adapters, etc.), and/or other suitable components.

The communication system 100 can also include a server 108. The server 108 can comprise one or more processors/controllers, data storage devices, user interfaces, communication adapters (e.g. transceivers, network adapters, etc.), and/or other suitable components. The server 108 can receive incoming communication packets 110, 112 containing session media from the communication devices 104, 106, and forward the communication packets to target destinations. For example, if a communication session has been established between the communication device 104 and the communication device 106, the server 108 can receive communication packet(s) 110 from the communication device 104 and forward such communication packet(s) 110 to the communication device 106. Similarly, the server 108 can receive communication packet(s) 112 from the communication device 106 and forward such communication packet(s) 112 to the communication device 104. Of course, if more than two communication devices are included in the communication session, the server 108 can forward the communication packets 110, 112 to any such communication devices that also are intended recipients of the session media.

Rather than immediately terminating the communication session when the communication device 104 determines that it is appropriate to terminate its participation in the communication session, for example due to inactivity or at the behest of a user, the communication device 104 can communicate a termination request 114 to the server 108. The server 108 can then make its own determination as to whether it is appropriate to terminate the communication device's participation in the communication session. Such determination can be made in any suitable manner.

For example, if the server 108 determines that no session media is being communicated or that no session media is pending communication to the communication device 104, or that sources allocated to the communication device 104 have been released, the server 108 can determine that the communication device's participation may terminate. If, however, the server 108 determines there is session media being communicated or pending communication to the communication device 104, the server 108 can determine that the communication device's participation may not terminate. The server can make the determination of whether it is appropriate to terminate the communication device's participation in the communication session in any other suitable manner, and the invention is not limited in this regard.

If the server 108 determines the communication device's participation in the communication session may terminate, the server 108 can communicate a termination authorization 116 to the communication device 104. The termination authorization 116 can indicate to the communication device 104 that termination of participation of the communication device 104 in the communication session is authorized. The termination authorization 116 can also indicate that the communication device 104 is no longer required to listen for session media in the communication session. For instance, in response to the termination authorization 116, the first communication device can cease listening for communication packet(s) 112.

In one arrangement, generation of the termination authorization 116 by the server 108 can further serve to cause the server 108 to halt communication of any new session media to the communication device 104, for example until a new communication session is established. In response to the termination notice, the communication device 104 can communicate a termination acknowledgment 118 indicating that it has received the termination authorization 116.

Optionally, a termination authorization 120 can also be communicated to other communication devices which are members of the communication session, for instance the communication device 106. The termination authorization 120 can be communicated to the second communication device 106 when, prior to, or after the termination authorization 116 is communicated to the first communication device 104. The termination authorization 120 can be a message that is similar to the termination authorization 116, or can be a different message. In response to the termination authorization 120, the communication device 106 can communicate a termination acknowledgment 122 to the server 108 indicating that it has received the termination authorization 116.

If the communication device 106 is to continue participating in the communication session, for instance communicating with communication devices other than the communication device 104, the termination authorization 116 need not be communicated to the communication device 106. Accordingly, the server 108 can maintain the communication session for such other devices, even though the participation of the communication device 104 may be terminated.

In addition to the termination authorization 116, additional session messages may be communicated from the server 108 to the communication device 104. For instance, a session progress message 124 can be communicated to the communication device 104 to indicate that the termination request 114 has been received, but that a response to the termination request 114 has not yet been generated. The session progress message 124 can also indicate a status of the server's response to the termination request. The server 108 can also communicate an acknowledgement 126 to the communication device 104 indicating that the termination request 114 has been received. The session progress 124 and acknowledgement 126 messages can be communicated before the termination authorization 116 is communicated.

FIG. 2 depicts an example of a signaling flow diagram 200 that is useful for understanding the present invention. In response to the termination request 114 being communicated from the communication device 104 to the server 108, the termination authorization 116 can be communicated from the server 108 to the communication device 104. Optionally, the session progress message 124 and/or the acknowledgement 126 can also be communicated from the server 108 to the communication device 104. The communication device can respond to the termination authorization 116 with the termination acknowledgement 118.

As noted, the termination authorization 120 can also be communicated from the server 108 to the communication device 106. The termination authorization 120 can be communicated when, prior to, or after the termination authorization 116. In response to the termination authorization 120, the communication device 106 can communicate the termination acknowledgement 122.

The termination request 114, termination authorizations 116, 120, termination acknowledgements 118, 122, progress message 124 and acknowledgement 126 (collectively referred to as "messages 114-126") can be communicated in any suitable manner. In one arrangement, the messages 114-126 can be communicated as Session Initiation Protocol (SIP) messages. Although SIP does not include a termination request method or a termination authorization method, the termination request 114 and termination authorization 116 can be generated by selectively modifying existing SIP methods in accordance with the inventive arrangements described herein. For example, to generate the termination request 114, the communication device 104 can generate an SIP message based on an existing SIP method, but modify the message in a manner that is recognizable by the server 108 as indicating a termination request 114.

For example, to generate the termination request 114, the communication device 104 can generate an INVITE message or, more particularly, a non-initial INVITE (i.e. re-INVITE) with respect to the existing communication session. In another arrangement, to generate the termination request 114, the communication device 104 can generate an UPDATE message or a BYE message. In the case of a BYE message, the communication device 104 can be configured not to immediately stop listening for session media if the BYE message is sent as a termination request.

In one arrangement, the communication device 104 can generate a re-INVITE message comprising media parameters that do not specify media. Providing a re-INVITE message with media parameters that do not specify media can indicate to the server 108 that the message is a request to terminate the communication session. In another example, the termination request 114 can comprise a message which includes signaling parameters comprising a termination request indicator. For example, these signaling parameters can be implemented in a header in a re-INVITE, an UPDATE, or a BYE message. Of course, the server 108 can be configured to recognize that such a message indicates a termination request 114. In another arrangement, a new SIP method can be defined to indicate a termination request, and the server 108 can be configured to recognize such a message.

In other arrangements the messages 114-126 can be communicated in accordance with other suitable communication protocols. Examples of such protocols may include, but are not limited to, Real Time Control Protocol (RTCP), and any of the variety of Open Mobile Alliance (OMA) protocols.

FIGS. 3-7 depict examples of termination requests that are useful for understanding the present invention. In particular, FIG. 3 depicts an example termination request 300 in accordance with the SIP re-INVITE method and FIG. 4 depicts a termination request 400 in accordance with the SIP UPDATE method. The termination request 300 can include signaling parameters 302 and/or media parameters 304. Similarly, the termination request 400 can include signaling parameters 402 and/or media parameters 404. The message bodies 304, 404 can be formatted in accordance with the Session Description Protocol (SDP). In such an arrangement, the message bodies 304, 404 can each comprise an SDP packet that does not specify media. The server can be configured to recognize that such media parameters 304, 404 indicate a request to terminate participation in a communication session.

Figures 5, 6:
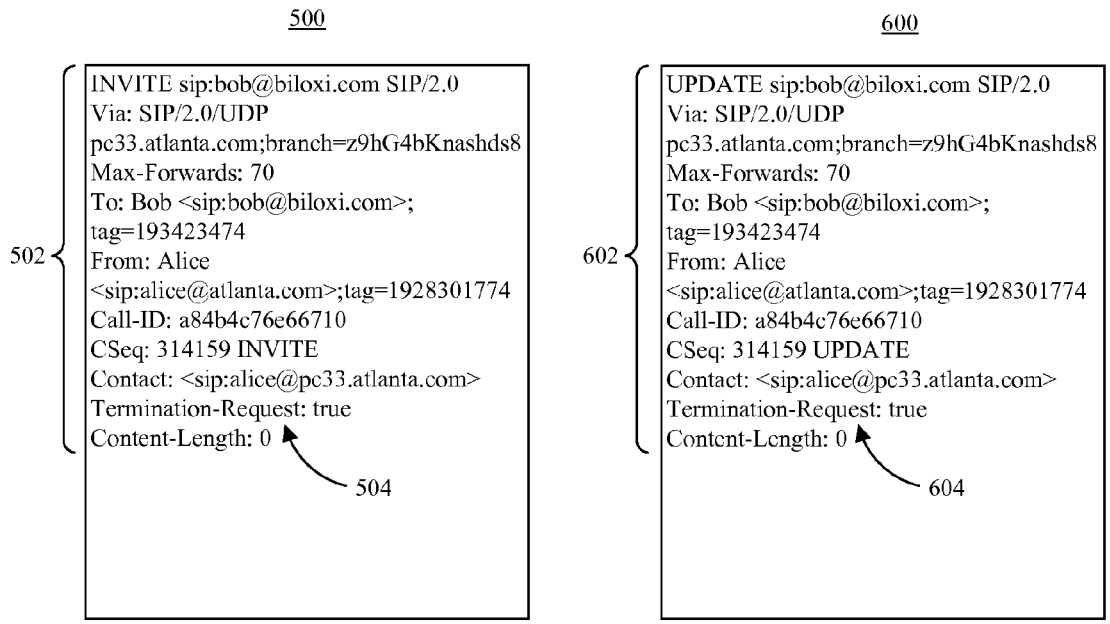
Figure 7:
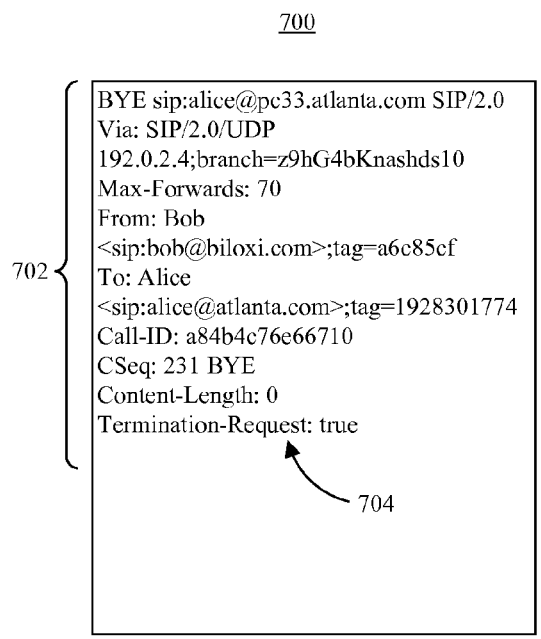

FIG. 5 depicts another example termination request 500 in accordance with the SIP re-INVITE method, FIG. 6 depicts another example of a termination request 600 in accordance with the SIP UPDATE method, and FIG. 7 depicts an example of a termination request 700 in accordance with the SIP BYE method. The termination requests 500, 600, 700 can each be formatted with respective signaling parameters 502, 602, 702 that are recognizable by the server as indicating a termination request. For instance, the signaling parameters 502, 602, 702 can each include a field 504, 604, 704 that indicates a termination request. In the examples, the fields 504, 604, 704 are identified as a "Termination-Request" header although the fields 504, 604, 704 can be defined in any other suitable manner and the invention is not limited in this regard.

FIG. 8 is a flowchart presenting a method 800 of terminating a communication device's participation in a communication session. The method 800 can begin in a state in which a first communication device is participating in a communication session with one or more other communication devices. Such a communication session can be controlled by a server which operates as a central controller for the communication session.

At step 802, the first communication device can determine that it may be appropriate to terminate its participation in the communication session. For example, the first communication device can detect inactivity in the communication session, or receive a user input indicating a request to end the participation. Proceeding to step 804, the first communication device can generate a first message indicating a request to terminate its participation in the communication session. As noted, such request can be identified in a body or a header of the message. Moreover, such message can be formatted in accordance with an SIP re-INVITE method, an UPDATE method or a BYE method. At step 806 the first message can be communicated to the server.

At step 808, a second message can be received from the server. The second message can be a message authorizing participation of the first communication device in the communication session to end. As noted, the second message can be an SIP BYE message.

Referring to decision box 810, if the second message indicates authorization to end participation in the communication session, at step 812 the participation of the first communication device in the communication session can be terminated. For instance, the first communication device can cease listening for session media in the communication session. Proceeding to step 814, the first communication device can communicate an acknowledgement to the server in response to receiving the termination authorization. In another arrangement, the acknowledgement communicated at step 814 can be performed prior to the termination of the participation in the communication session at step 812. If, however, the second message does not indicate authorization to end participation in the communication session, at step 816 the communication device can continue its participation in the communication session.

FIG. 9 is a flowchart presenting a method 900 of terminating a communication device's participation in a communication session. The method 900 can also begin in a state in which a first communication device is participating in a communication session with one or more other communication devices.

At step 902, a first message can be received from the first communication device. The first message can indicate a request to terminate the first communication device's participation in a communication session. For instance, the request can be indicated via signaling or media parameters, as previously described. In one arrangement, the first message can be received by a server which operates as a central controller for the communication session.

Referring to decision box 904, the server can determine whether the first communication device's participation in the communication session can be terminated. As noted, the server can make such determination in any suitable manner. If the first communication device's participation can be terminated, the process can proceed to step 906 and a second message can be communicated to the first communication device. The second message can authorize the first communication device to terminate its participation in the communication session. If the communication device's participation in the communication session may not be terminated, the process can proceed to step 908 and the second message can decline the request to terminate the participation in the communication session. Again, the second message can be communicated to the first communication device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention can also be embedded in a program storage device readable by a machine, tangibly embodying a program of instructions executable by the machine to perform methods and processes described herein. The present invention can also be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method for a participating communication device to terminate its participation in an ongoing communication session with one or more other communication devices, the method comprising:

the participating communication device generating a first message requesting permission to terminate its participation in the ongoing communication session;

the participating communication device communicating the first message to a server;

the participating communication device continuing to listen for session media until receiving authorization from the server to terminate its participation in the ongoing communication session;

the participating communication device receiving a second message from the server authorizing the termination of the participating communication device's participation in the ongoing communication session; and responsive to receiving the second message, the participating communication device terminating its participation in the ongoing communication session.

2. The method of claim 1, wherein the first message comprises media parameters that do not specify media, the lack of specifying media in the media parameters indicating a request to terminate participation in the ongoing communication session.

3. The method of claim 2 wherein the first message is one of a SIP re-INVITE and a SIP UPDATE message modified to comprise the media parameters that do not specify media.

4. The method of claim 1, wherein the first message comprises signaling parameters that contain a termination request, the termination request indicating a request to terminate participation in the ongoing communication session.

5. The method of claim 4 wherein the first message is one of a SIP re-INVITE, a SIP UPDATE, and a SIP BYE message modified to contain the termination request as a signaling parameter.

6. The method of claim 1, wherein the first message is a SIP re-INVITE message.

7. The method of claim 1, wherein the first message is a SIP UPDATE message.

8. The method of claim 1, wherein the first message is a SIP BYE message.

9. The method of claim 1, further comprising, prior to the participating communication device receiving the second message, the participating communication device receiving one of (i) a session progress message indicating that the first message has been received by the server but that a response has not yet been generated and (ii) an acknowledgement indicating that the first message has been received by the server.

10. A method for terminating a first participating communication device's participation in an ongoing communication session, comprising:

receiving, at a server from the first communication device, a first message requesting permission to terminate participation in the ongoing communication session;

the server, responsive to receiving the first message and determining that there is no session media being communicated or pending communication to the first communication device, generating at least a second message, the second message authorizing the first communication device to terminate its participation in the ongoing communication session; and the server communicating the second message to the first communication device without terminating the ongoing communication session with respect to at least one other participating communication device.

11. The method of claim 10, wherein the first message comprises media parameters that do not specify media, the lack of specifying media in the media parameters indicating a request to terminate participation in the ongoing communication session.

12. The method of claim 11 wherein the first message comprises one of a SIP re-INVITE and a SIP UPDATE message modified to comprise the media parameters that do not specify media.

13. The method of claim 10, wherein the first message comprises signaling parameters that contain a termination request, the termination request indicating the request to terminate participation in the ongoing communication session.

14. The method of claim 13 wherein the first message is one of a SIP re-INVITE, a SIP UPDATE, and a SIP BYE message modified to contain the termination request as a signaling parameter.

15. The method of claim 10, wherein the first message is a SIP re-INVITE message.

16. The method of claim 10, wherein the first message is a SIP UPDATE message.

17. The method of claim 10, wherein the first message is a SIP BYE message.

18. The method of claim 10, further comprising communicating a third message to a second communication device, the third message authorizing the second communication device to terminate its participation in the ongoing communication session.

19. The method of claim 10, further comprising the server, after receiving the first message and prior to communicating the second message, transmitting to the participating communication device one of (i) a session progress message indicating that the first message has been received by the server but that a response has not yet been generated and (ii) an acknowledgement indicating that the first message has been received by the server.

20. A program storage device readable by a machine, tangibly embodying instructions executable by the machine to perform operations including terminating the machine's participation in an ongoing communication session, said operations comprising:
    generating a first message requesting permission to terminate the machine's participation in the ongoing communication session;
    communicating the first message to a server;
    continuing to listen for session media until receiving authorization from the server to terminate its participation in the ongoing communication session;
    receiving a second message from the server authorizing the termination of the machine's participation in the ongoing communication session; and
    responsive to receiving the second message, terminating the machine's participation in the ongoing communication session.

* * * * *